United States Patent [19]
Pan et al.

[11] Patent Number: 5,748,350
[45] Date of Patent: May 5, 1998

[54] DENSE WAVELENGTH DIVISION MULTIPLEXER AND DEMULTIPLEXER DEVICES

[75] Inventors: Jing-Jong Pan, Milpitas; Simon X. F. Cao, San Mateo; Yuan Shi, San Jose; Donna S. Yu, Danville, all of Calif.

[73] Assignee: E-Tek Dynamics, Inc., San Jose, Calif.

[21] Appl. No.: 667,998

[22] Filed: Jun. 19, 1996

[51] Int. Cl.$^6$ .................................................. H04J 14/02
[52] U.S. Cl. ........................... 359/130; 359/127; 385/37
[58] Field of Search ...................... 359/127, 130, 359/131; 385/37

[56] References Cited

U.S. PATENT DOCUMENTS

| | | | |
|---|---|---|---|
| 4,880,289 | 11/1989 | Imoto et al. | 359/131 |
| 5,457,760 | 10/1995 | Mizrahi | 359/130 |
| 5,608,825 | 3/1997 | Ip | 359/130 |
| 5,623,565 | 4/1997 | Blair et al. | 359/126 |

FOREIGN PATENT DOCUMENTS

| 0066213 | 4/1985 | Japan | 359/131 |
|---|---|---|---|

*Primary Examiner*—Leslie Pascal
*Attorney, Agent, or Firm*—Townsend and Townsend and Crew LLP

[57] ABSTRACT

Multiplexer and demultiplexer devices for Dense WDM networks are described. The devices use an optical circulator, a plurality of bandpass wavelength division units and fiber Bragg gratings arranged in the optical fibers interconnecting the optical circulator and the bandpass wavelength division units. The optical circulator is connected to a network optical fiber and the bandpass wavelength division units are connected to a plurality of input/output optical fibers. Each fiber Bragg grating has a narrow wavelength reflection band about a predetermined wavelength and is arranged so that optical signals at wavelengths differing from predetermined wavelengths of the first optical fibers connected to a bandpass wavelength division unit are blocked and reflected. Depending upon the direction of the optical circulator, the device may be a multiplexer or a demultiplexer. Alternatively, a 3dB optical coupler may be used in place of the optical circulator with a corresponding rearrangement of the fiber Bragg gratings.

32 Claims, 10 Drawing Sheets

DENSE WAVELENGTH DIVISION MULTIPLEXER AND DEMULTIPLEXER DEVICES

BACKGROUND OF THE INVENTION

The present invention is related to the field of optical fiber technology, and more particularly, to multiplexer and demultiplexer devices for wavelength division multiplexed (WDM) fiberoptic networks.

In a WDM network, the wavelengths of optical signals are used to direct the signals from their sources to the desired destinations. Wavelength dependent multiplexer and demultiplexer devices are used in such networks. A WDM multiplexer receives signals at different wavelengths from many sources and combines them into a single output signal. A demultiplexer receives such a signal consisting of several wavelengths, separates the received signal into signals of different wavelengths, and directs these signals toward different destinations according to wavelength.

Of course, the more narrow the linewidths of the various sources which operate on a network, the greater the number of communication channels which can operate over the network. Recently the International Telecommunications Union has proposed a Dense WDM network standard with channels having a frequency separation of 100 GHz (or a wavelength separation of 0.8 nm). The performance requirements for a Dense WDM network, such as those for bandwidth, crosstalk, polarization dependent loss, polarization mode dispersion, insertion loss, become more stringent. Conventional WDM multiplexer and demultiplexer devices suffer from various performance deficiencies. Furthermore, any multiplexer or demultiplexer should be manufactured with manufacturing costs as low as possible, small device size for easy installation, and reliable and stable performance over a variety of environmental conditions.

The present invention solves or substantially mitigates these problems with WDM multiplexer and demultiplexer devices which have high performance, reasonable costs, compact size and stable performance over many environmental conditions.

SUMMARY OF THE INVENTION

The present invention provides for a wavelength division multiplexer/demultiplexer device which is connected to a plurality of first optical fibers for carrying optical signals at predetermined wavelengths, each predetermined wavelength different from another, and to a second optical fiber for carrying optical signals at all of the predetermined wavelengths. The wavelength division multiplexer/demultiplexer device has an optical circulator, a plurality of bandpass wavelength division units, and at least one set of fiber Bragg gratings. The optical circulator has at least three ports and serially passes optical signals received at one port to another port. One of optical circulator ports is connected to the second optical fiber. Each bandpass wavelength division unit is connected to one of the remaining optical circulator ports and to a set of said first optical fibers to pass optical signals between the set of first optical fibers and the connected port. The set of fiber Bragg gratings is connected between an optical circulator port and a bandpass wavelength division unit. Each fiber Bragg grating has a narrow wavelength reflection band about a predetermined wavelength and arranged so that optical signals at wavelengths differing from predetermined wavelengths of the set of first optical fibers connected to said bandpass wavelength division unit are blocked and reflected.

Depending upon the direction of operation among the ports of the optical circulator, a WDM multiplexer or demultiplexer is created with high performance sufficient for the proposed Dense WDM networks.

The present invention also provides for a WDM multiplexer/demultiplexer device which is connected to a plurality of first optical fibers for carrying optical signals at predetermined wavelengths, each predetermined wavelength different from another, and to a second optical fiber for carrying optical signals at all of the predetermined wavelengths. The multiplexer/demultiplexer device has at least one optical coupler, such as a fused biconical coupler or a waveguide divider coupler, a plurality of bandpass wavelength division units and an arrangement of fiber Bragg gratings connected between the optical coupler and each of the bandpass wavelength division units. The bandpass wavelength division units are connected to the first optical fibers and the fiber Bragg gratings are arranged so that only optical signals of predetermined wavelengths pass between the optical coupler and each of the bandpass wavelength division couplers. The device is bidirectional and may be used as a multiplexer and a demultiplexer.

BRIEF DESCRIPTION OF THE DRAWINGS

FIGS. 2L–2O illustrate the light signals on each of the output optical fibers of another bandpass wavelength division unit;

DETAILED DESCRIPTION OF THE SPECIFIC EMBODIMENTS

The present invention uses a combination of bandpass wavelength division couplers and fiber Bragg gratings which have precise and narrow wavelength reflection bands. The organization of these couplers and gratings into a high performance WDM multiplexer is illustrated in FIG. 1 according to one embodiment of the present invention.

Figure 1A:
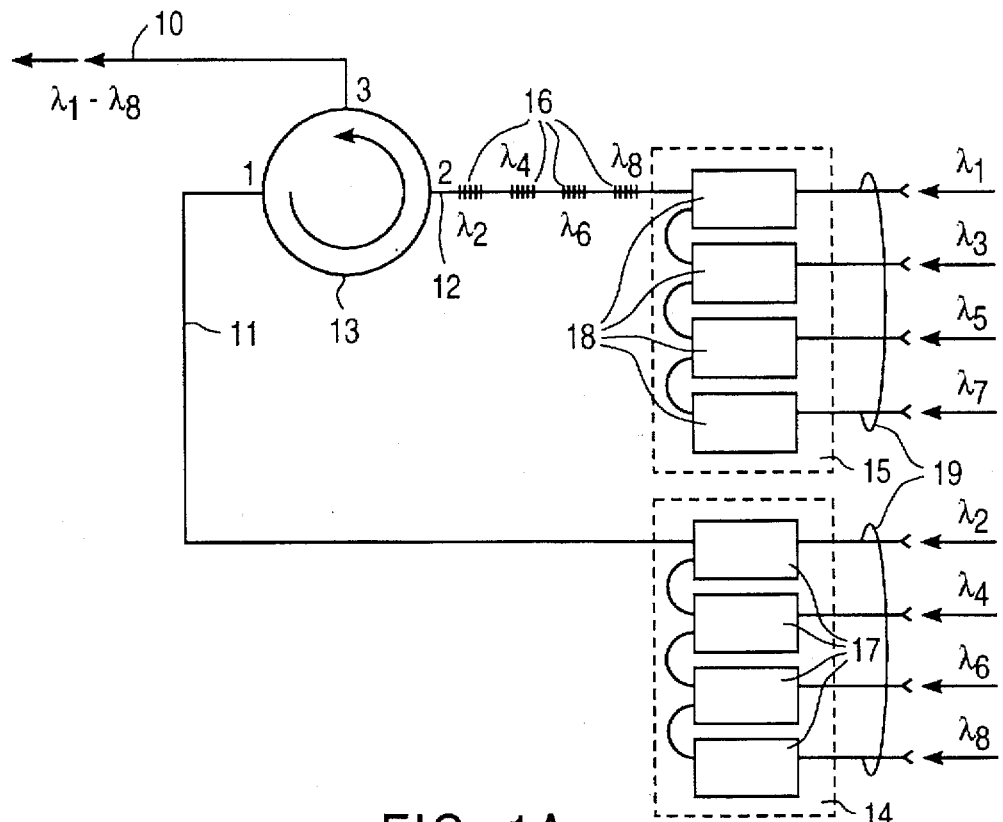
FIG. 1A illustrates the organization of a wavelength division multiplexer device according to one embodiment of the present invention.

The FIG. 1A multiplexer has an optical circulator 13 which has three ports. Optical signals received at port 1 are passed to port 2 as output signals. Signals received at port 2 are passed to port 3 as output signals. A circular arrow illustrates the direction of optical signals in the circulator 13 and the numbers 1, 2 and 3 indicate the port numbers.

Port 1 is connected by an optical fiber 11 to a bandpass wavelength division unit 14. The unit 14 is connected to four input optical fibers which receive optical signals at different wavelengths, $\lambda_2$, $\lambda_4$, $\lambda_6$ and $\lambda_8$, respectively. Port 2 of the optical circulator 13 is connected to a second bandpass wavelength division unit 15 which likewise is connected to four input optical fibers which receive optical signals at different wavelengths, $\lambda_1$, $\lambda_3$, $\lambda_5$ and $\lambda_7$, respectively. The optical fiber 12 has four fiber Bragg gratings 16 which each has a narrow reflection band centered about a wavelength of the optical signals being received by the first bandpass wavelength division unit 14. In other words, each of the fiber Bragg gratings 16 has a reflection band centered about $\lambda_2$, $\lambda_4$, $X_6$ or $X_8$. Each of the fiber Bragg gratings 16 reflects optical signals in its narrow reflection band and transmits optical signals at other wavelengths.

The bandpass wavelength division units 14 and 15 are each formed by interconnected bandpass filter couplers 17 and 18 respectively. As shown, each of the couplers 17 and 18 is connected to one of the input optical fibers 19. The actual interconnection of these couplers 17 and 18 in the units 14 and 15 are detailed below. Each bandpass filter coupler 17 and 18 blocks or reflects light at all wavelengths, except for light in a predetermined wavelength range or band.

Operationally, the bandpass filter couplers 17 are interconnected in the unit 14 so that the filtered input signals at wavelengths $\lambda_2$, $\lambda_4$, $\lambda_6$ and $\lambda_8$, each wavelength from one of the four input fibers 19 connected to the unit 14, are transmitted onto the optical fiber 11 into port 1 of the optical circulator 13. The optical circulator 13 passes these signals to port 2 and the optical fiber 12. The fiber Bragg gratings 16, having reflection bands centered about these wavelengths, $\lambda_2$, $\lambda_4$, $\lambda_6$ and $\lambda_8$, reflect the signals back to port 2 and out through port 3 onto the output fiber 10.

The bandpass filter couplers 18 in the bandpass wavelength division unit 15 filter the input signals received from the connected input optical fibers 19 and pass these signals at $\lambda_1$, $\lambda_3$, $\lambda_5$ and $\lambda_7$ to the optical fiber 12. Since the fiber Bragg gratings 16 have reflection bands different from these wavelengths, $\lambda_1$, $\lambda_3$, $\lambda_5$ and $\lambda_7$, the optical signals are passed into port 2 and out through port 3 onto the output fiber 10. In this manner, the device shown in FIG. 1 operates as a multiplexer.

This multiplexer has a high performance. Besides the bandpass filtering of the signals received through the input fibers 19 by the bandpass couplers 17 and 18, the fiber Bragg gratings 16 enhance the isolation between the wavelengths and minimize the crosstalk between communication channels. The signal wavelengths are selected so alternatingly spaced wavelengths operate with one unit 14, while remaining alternatingly spaced wavelengths operate with the other unit 15. The signals at $\lambda_2$, $\lambda_4$, $\lambda_6$ and $\lambda_8$ are filtered by the reflection operation of the gratings 16 before being passed to the output fiber 10. Furthermore, the wavelength spacings of the fiber Bragg gratings 16 further filter the signals at $\lambda_1$, $\lambda_3$, $\lambda_5$ and $\lambda_7$ from the unit 15.

Figure 1B:
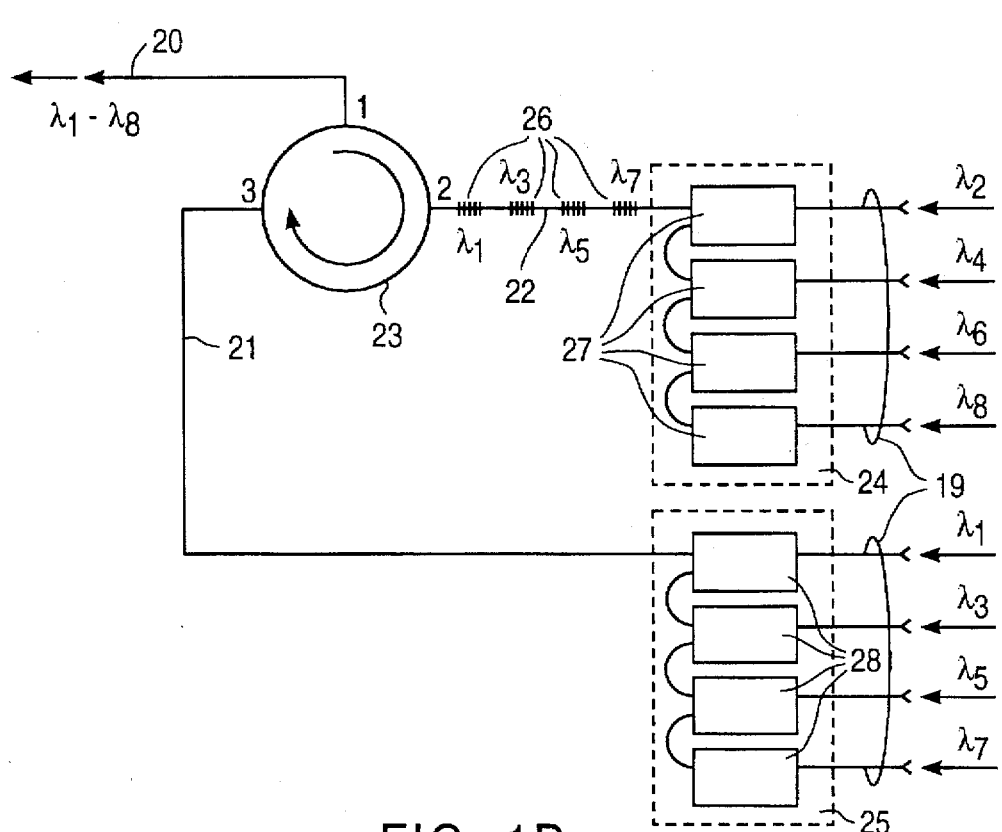
FIG. 1B illustrates the organization of a wavelength division demultiplexer device according to another embodiment of the present invention.

A WDM demultiplexer device can similarly be constructed according to the present invention. In FIG. 1B the demultiplexer device has an optical circulator 23 which has a port 1 connected to an optical fiber 20, a port 2 connected to an optical fiber 22, and a port 3 connected to an optical fiber 21. The optical circulator 23 receives signals at port 1 and passes these signals to port 2 as output signals. Optical signals received at port 2 are transmitted to port 3 as output signals. Port 2 is connected to a bandpass wavelength division unit 24 by the optical fiber 22, which has four fiber Bragg gratings 26, each with narrow reflection band centered about one of the wavelengths, $\lambda_1$, $\lambda_3$, $\lambda_5$ and $\lambda_7$. Port 3 is connected to bandpass wavelength division unit 25 by the optical fiber 21.

The bandpass wavelength division unit 24 has bandpass filter couplers 27 which are interconnected to each other and connected to output optical fibers 29 so that each connected optical fiber 29 receives optical signals at a selected wavelength, here $\lambda_2$, $\lambda_4$, $\lambda_6$ or $\lambda_8$. The actual interconnections for the couplers 27 for the unit 24 (and the couplers 28 for the unit 25) are shown in detail below. The optical signals which are reflected by the fiber Bragg gratings 26 are passed through the port 3 and the optical fiber 21. The bandpass wavelength division unit 25 has bandpass filter couplers 28 which are interconnected to each other and connected to output optical fibers 29 so that each connected optical fiber 29 receives optical signals at a selected wavelength, $\lambda_1$, $\lambda_3$, $\lambda_5$ or $\lambda_7$.

The elements of the demultiplexer of FIG. 1B operate similarly to the elements of the multiplexer of FIG. 1A. But for a better understanding of the operation of the present invention, the graphs of FIGS. 2A–2O plot the intensity versus wavelength at various optical nodes of the demultiplexer of FIG. 1B.

Figure 2A:
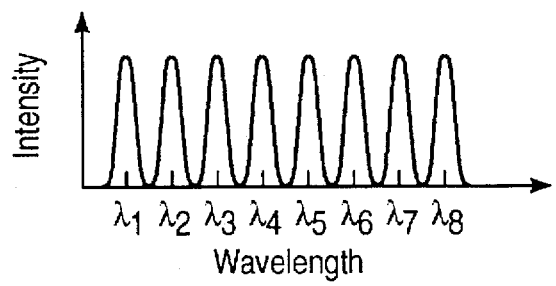
FIGS. 2A–2O are graphs of intensity vs. wavelengths at various optical nodes of the demultiplexer device of FIG. 1B, FIGS. 2A and 2B illustrate the light signals entering port 1 and leaving port 2 respectively, of the optical circulator.
Figure 2B:
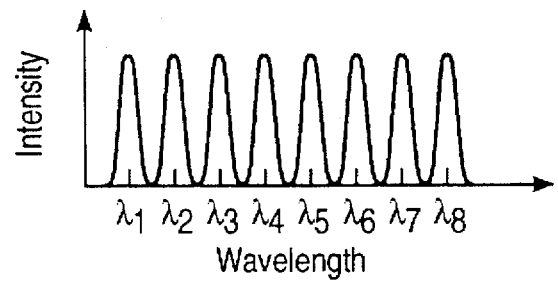
Figure 2C:
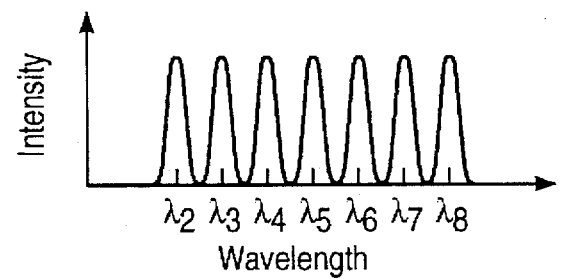
FIGS. 2C–2F illustrate the light signals after passing one or more of the fiber Bragg gratings.
Figure 2D:
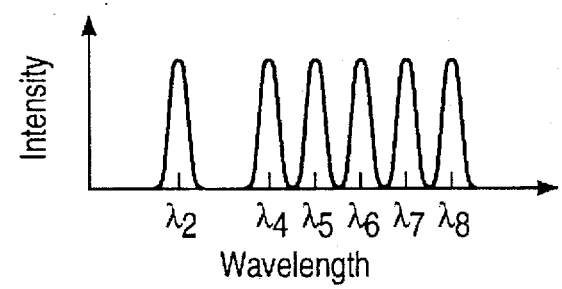
Figure 2E:
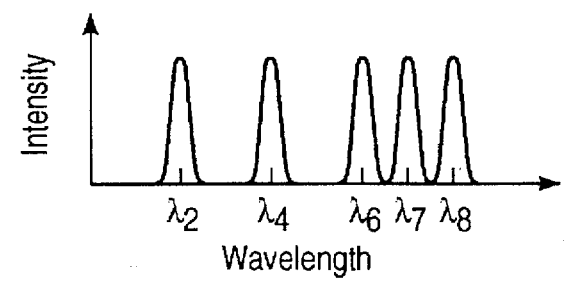
Figure 2F:
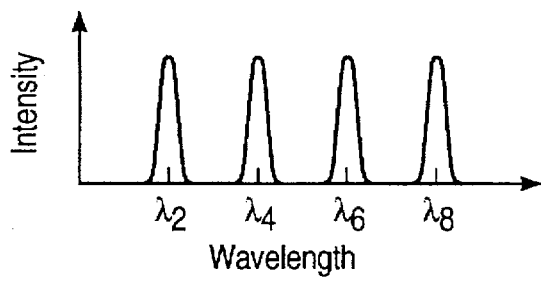
Figure 2I:
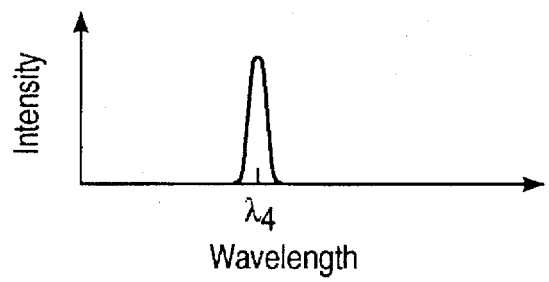
FIGS. 2H–2K illustrate the optical signals on each of the output optical fibers of one bandpass wavelength division unit.

FIG. 2A represents the optical signals at all wavelengths, $\lambda_1$–$\lambda_8$, being carried by the optical fiber 20 into port 1 of the optical circulator 23. These signals are passed to port 2, as shown in FIG. 2B. The graph of FIG. 2C illustrates the state of the optical signals after the first fiber grating 26 has been passed. The optical signals at wavelength $\lambda_1$ have been removed. FIG. 2D illustrates the state of the signals on the optical fiber 22 after passing the second fiber Bragg grating 26, which has a narrow reflection band centered about wavelength $\lambda_3$. The FIG. 2E graph illustrates the state of the optical signals at the node on fiber 22 between the third and fourth fiber gratings 26. As expected, optical signals centered about the wavelength $\lambda_5$ are removed. Finally, the graph on FIG. 2F illustrates how the last fiber Bragg grating 26 removes the optical signals centered about $\lambda_7$ from the optical signals being carried by the fiber 22 into the bandpass wavelength division unit 24. The FIGS. 2F and 2G graphs also show the operation of the alternate spacings of the signal wavelengths, $\lambda_1$, $x_3$, $\lambda_5$, $+_7$ and $\lambda_2$, $\lambda_4$, $\lambda_6$, $\lambda_8$, with the fiber gratings in the demultiplexer.

Figure 2G:
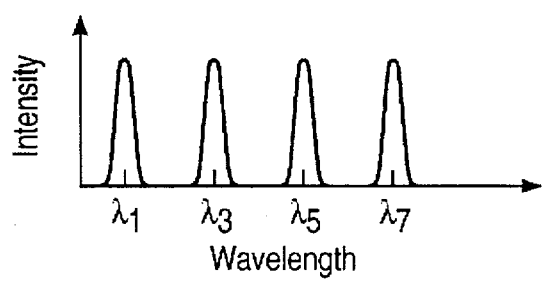
FIG. 2G illustrate the light signals leaving port 2 of the optical circulator.
Figure 2J:
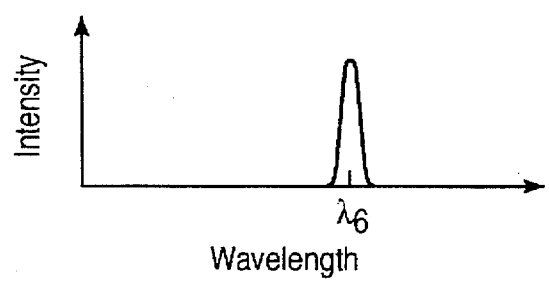
Figure 2H:
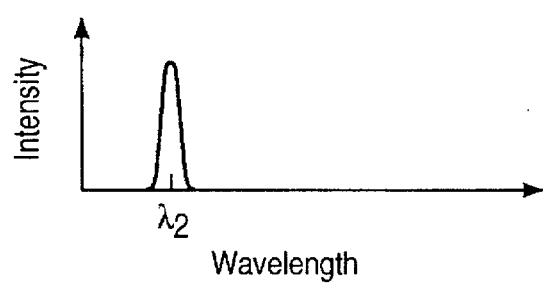
Figure 2K:
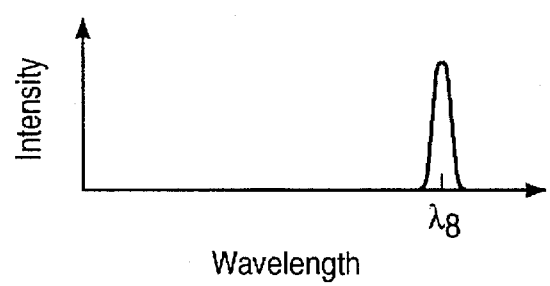
Figure 2L:
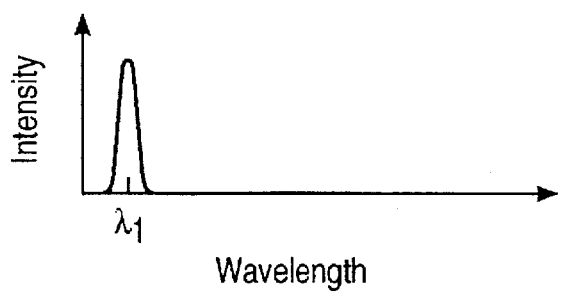
Figure 2M:
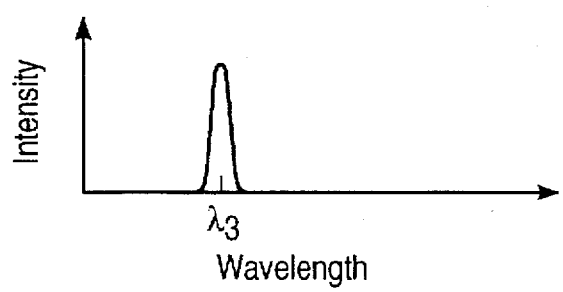
Figure 2N:
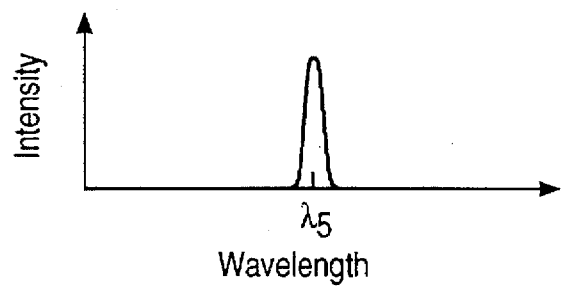
Figure 2O:
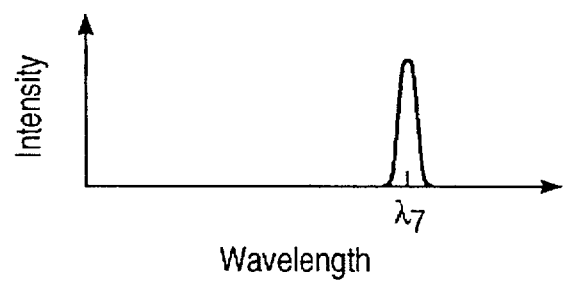

Thus, the fiber Bragg gratings 26 have reflected optical signals at wavelengths $\lambda_1$, $\lambda_3$, $\lambda_5$ and $\lambda_7$ back into port 2 which passes these optical signals to port 3 of the optical circulator 23. The graph of FIG. 2G illustrates the optical signals being transmitted through the port 3 into the optical fiber 21. The graphs of FIGS. 2H–2K respectively show the optical signals on each of the output fibers 29 connected to the bandpass wavelength division unit 24 and its bandpass filter couplers 27. Similarly, the graphs of FIGS. 2L–2O show the signals from the bandpass filter couplers 28 of the bandpass wavelength division unit 25 to their connected output optical fibers 29.

It should be noted that the structures of the multiplexer of FIG. 1A and the demultiplexer of FIG. 1B are nearly the same. The difference lies in the direction of circulation between the ports of the optical circulator. Thus if the optical circulator 23 in FIG. 1B were to reverse its direction of circulation, the FIG. 1B demultiplexer could operate as a multiplexer like that shown in FIG. 1A. Similarly, if the optical circulator 13 were to reverse its circulation direction, the FIG. 1A multiplexer could operate as a demultiplexer as shown in FIG. 1B.

Figure 3A:
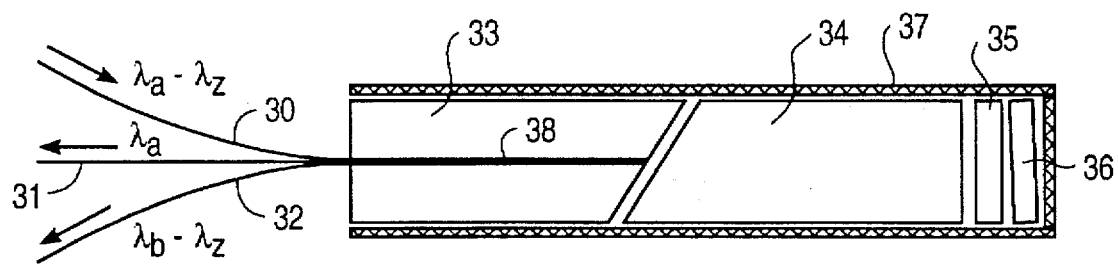
FIG. 3A is a detailed cross-sectional side view of a bandpass wavelength division coupler in the devices of FIGS. 1A and 1B.

FIG. 3A details the organization of one of the bandpass WDM couplers in the multiplexer and demultiplexer devices of FIGS. 1A and 1B. The WDM coupler has the ends of three optical fibers 30–32, a sleeve 33, a collimating GRIN lens 34, a bandpass filter 35, and a reflecting element 36. A hollow, cylindrical jacket 37 of stainless steel holds these elements of the coupler in place.

Figure 3B:
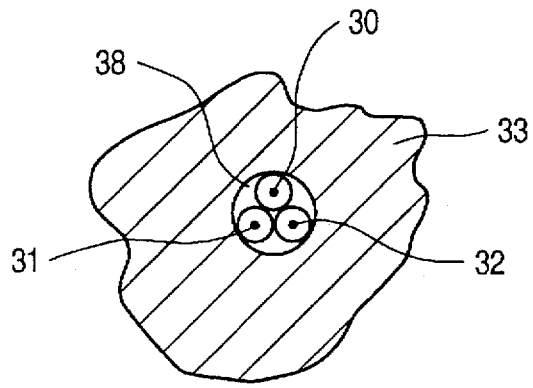
FIG. 3B is a detailed cross-sectional end view of the FIG. 3A bandpass wavelength division coupler.

The ends of the optical fibers 30–32 are unjacketed so that only the core and cladding of the fibers are inserted into a central aperture 38 which runs longitudinally through the sleeve 33, which is formed from glass. The core and cladding of the fibers 30–32 may or may not be tapered, but, in any case, are inserted into the aperture 38 without being fused together. The size of the central aperture 38 is such that the three optical fibers 30–32 fit snugly in the aperture. An enlarged end view of the fibers 30–32 in the aperture 38 is shown in FIG. 3B.

The face of the sleeve 33 (and the ends of the fibers 30–32) toward the collimating GRIN lens 34 is polished at an angle from 8°–12° from a plane perpendicular to the longitudinal axis of the sleeve 33. The face of the lens 34 toward the sleeve 33 is also angle-polished, but at a reciprocal angle, as shown in FIG. 3A. Stated in broad terms, the lens 34 collimates light from the fibers 30–32 (which appears as point sources) toward the filter 35. Similarly, the lens 34 refocuses collimated light from the direction of the filter 35 toward the optical fibers 30–32 into points. While a conventional lens could be used in place of the collimating GRIN lens 34, a quarter-pitch GRIN (GRaded INdex) lens has been found to be superior in terms of ease of assembly and reliability in the completed coupler.

The bandpass filter 35 transmits light in a narrow spectral range, say, selected wavelength $\lambda_a$, and blocks (reflects) light at other wavelengths. Light which is blocked by the filter 35 is reflected back through the lens 34. The light from the optical fibers 30–32 is collimated after a pass through the lens 34 toward the filter 35 and is refocussed after a second pass through the lens 34 toward the optical fibers 30–32. Thus the filter 35 can be adjusted so that the light from the core of one optical fiber 30–32 is refocussed into the core of another optical fiber. Light which is passed by the filter 35 remains collimated.

As shown in FIG. 3A, light signals at various exemplary wavelengths, $\lambda_a, \lambda_b, \lambda_c, \ldots \lambda_z$, are sent as input signals over the first optical fiber 30 into the WDM coupler. The signals on the optical fiber 30 are collimated by the GRIN lens 34 and passed to the bandpass filter 35. The bandpass filter 35 reflects the light signals at all the wavelengths except a narrow spectral band transmission centered around wavelength $\lambda_a$. The reflected light signals of $\lambda_b, \lambda_c, \ldots \lambda_z$, pass the GRIN lens 34 again which refocuses the reflected light signals at the end of the second optical fiber 32. The reflected light signals are transmitted to the optical fiber 32. The light signal at $\lambda_a$ which is passed by the bandpass filter 35, is reflected by the reflecting element 36 back through the bandpass filter 35 to the GRIN lens 34. The GRIN lens 34 refocuses the light signal $\lambda_a$ at the end of the third optical fiber 31. Thus, the incoming light signals at wavelength $\lambda_a$ selected by the bandpass filter 35 are separated from the first optical fiber 30 to the fiber 31; the light signals at all the other wavelengths are transmitted to the optical fiber 32. Conversely, it should be noted the light signals at the selected wavelength $\lambda_a$ can be added through the optical fiber 31 to the first optical fiber 30 and light signals at all the other wavelengths can be added through the optical fiber 32 to the first optical fiber 30. The WDM coupler in FIG. 3A can choose different bandpass filter 35 for selecting different wavelength $\lambda_i$ (i=a,b, ..., z) for selection of different light signals.

The WDM coupler in FIG. 3A has the advantages not only of performance, but also of very small size. The couplers include only the end sections of optical fibers, a sleeve for the optical fibers, a GRIN lens, a wavelength-dependent filter and a reflecting element. The limited number of components permits a very compact WDM coupler. For example, the WDM coupler of FIG. 3A can be manufactured in a 3.2×16 mm package. Isolation between the two channels is high, approximately 50 dB.

Further details of the WDM coupler are described in U.S. Appln. Ser. No. 08/614,864, entitled "INTEGRATED WDM COUPLER DEVICES FOR FIBEROPTIC NETWORKS," filed Mar. 13, 1996 by Jingyu Xu and Jing-Jong Pan, and assigned to the present assignee.

While four bandpass filter couplers, detailed in FIG. 3A, are shown as being connected serially in the units 14 and 15 in FIG. 1A and the units 24 and 25 in FIG. 1B, the bandpass wavelength division units 14, 15 and 24, 25 may, of course, be designed for more (or less) input and output optical fibers. Furthermore, the couplers may be arranged differently. In fact, four couplers are not required for four input or output optical fibers.

Figure 4A:
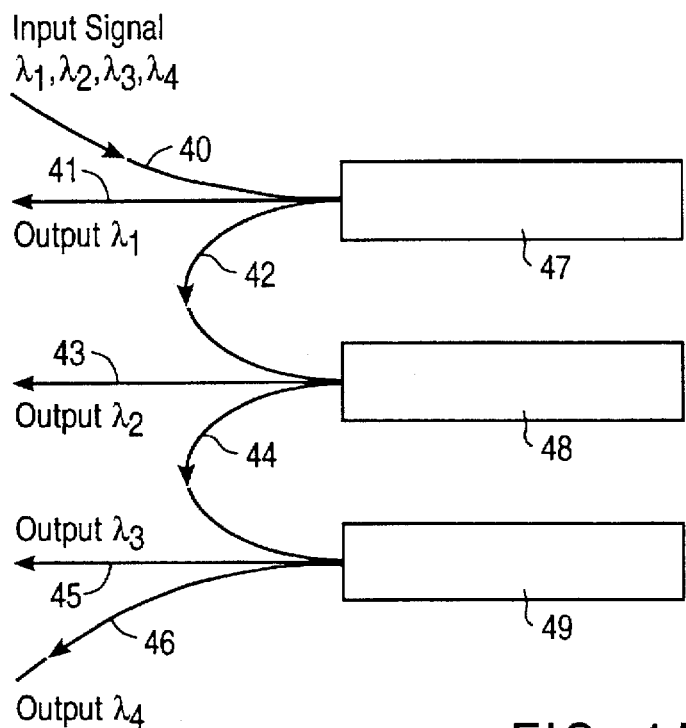
FIG. 4A illustrates one organization of bandpass wavelength division couplers for the bandpass wavelength division units of FIGS. 1A and 1B according to the present invention.
Figure 4A:
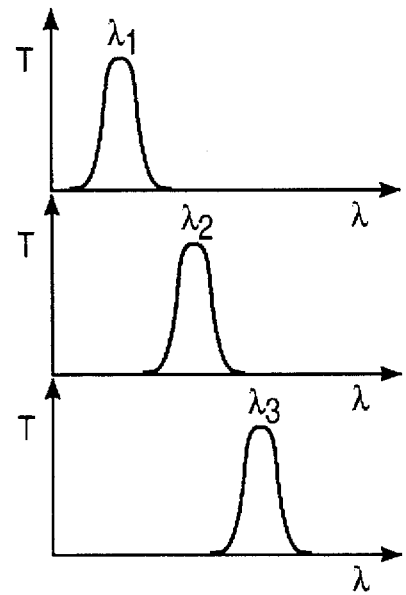

FIG. 4A shows a serial interconnection with three bandpass filter couplers 47–49 for four output optical fibers 41, 43, 45 and 46. Note that while the wavelengths $\lambda_1$–$\lambda_4$ are used for purposes of explanation, these wavelengths do not necessarily correspond to those in the previous figures. The wavelengths are merely selected to illustrate the operation of the interconnected bandpass filter couplers 47–49 of FIG. 4A and the drawings thereinafter.

In FIG. 4A, an optical fiber 40 carries optical signals at four different wavelengths $\lambda_1$–$\lambda_4$. The bandpass optical filter coupler 47 is such that its bandpass filter transmits signals of wavelength $\lambda_1$, which are reflected back by a high reflection element behind the bandpass filter. The signals at $\lambda_1$ then pass the bandpass filter again and are directed into the optical fiber 41. Optical signals at other wavelengths are reflected by the bandpass filter into the optical fiber 42. These signals then pass into the bandpass filter coupler 48. In other words, the bandpass filter coupler 47 functions to pick up optical signals at $\lambda_1$ and directs them into the optical fiber 41, and, at the same time, to reflect optical signals at other wavelengths and pass them to the next bandpass filter coupler. With the same working principle, the bandpass filter coupler 48 picks optical signals at wavelength $\lambda_2$ and directs them into the optical fiber 43. Optical signals at other wavelengths pass into the optical fiber 44, which transmits those signals into the bandpass filter coupler 49. The bandpass filter coupler 49 similarly picks optical signals at $\lambda_3$ and directs them into the optical fiber 45. The remaining optical signals at $\lambda_4$ are reflected into the optical fiber 46. It must be noted that the bandpass filter couplers 47–49 can operate in the reverse direction so that this arrangement can also be used as a bandpass wavelength division unit for a WDM multiplexer, as in FIG. 1A. In such a case, the optical fibers 41, 43, 45 and 46 become input optical fibers and the optical fiber 40 an output optical fiber.

Figure 4B:
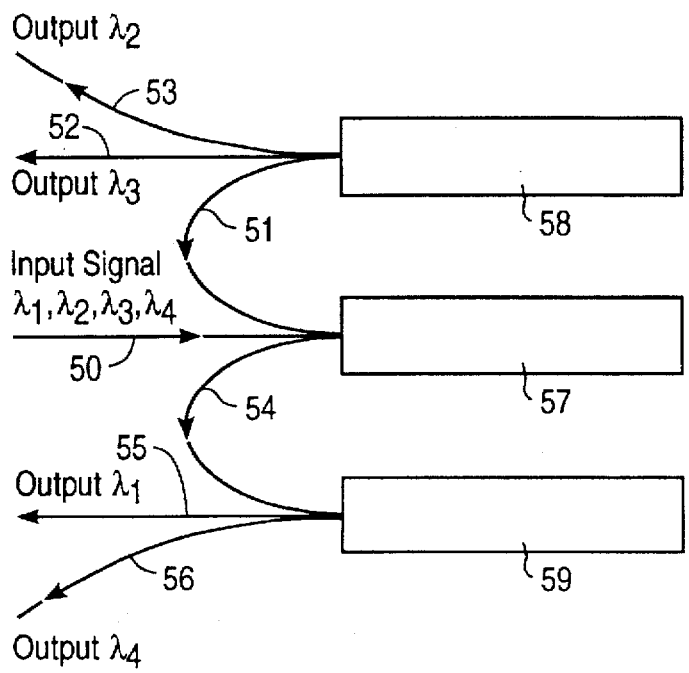
FIG. 4B illustrates another organization of bandpass wavelength division couplers for the bandpass wavelength division units of FIGS. 1A and 1B according to the present invention.
Figure 4B:
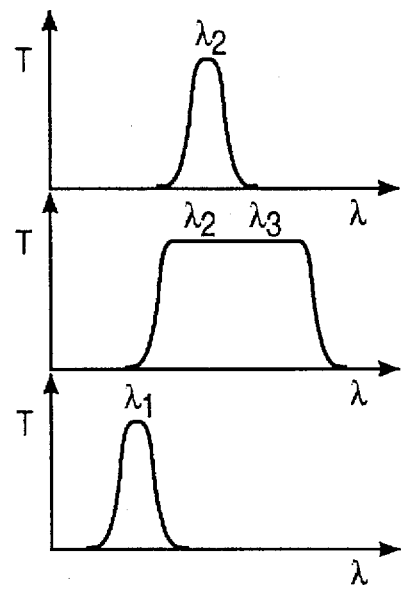

FIG. 4B illustrates another arrangement for bandpass filter couplers 57–59. An optical fiber 50 carries optical signals at wavelengths $\lambda_1$–$\lambda_4$ into the coupler 57. The coupler 57 has a broad bandpass filter which allows optical signals at $\lambda_2$ and $\lambda_3$ to be passed. Hence the bandpass filter coupler 57 reflects optical signals at $\lambda_1$ and $\lambda_4$ into the optical fiber 54. Optical signals at $\lambda_2$ and $\lambda_3$ are directed into the optical fiber 51 which passes these signals into the bandpass filter coupler 58. This coupler has its bandpass filter centered about optical signals at $\lambda_2$. The reflected optical signals at $\lambda_3$ are directed into the optical fiber 52 and the optical signals at $\lambda_2$ are passed into the optical fiber 53. The bandpass filter coupler 59 has its bandpass filter passing signals at $\lambda_1$. Thus, the optical signals at $\lambda_4$ are reflected into the optical fiber 56 and the passed optical signals at $\lambda_1$ are directed into the optical fiber 55. As in the bandpass filter coupler arrangement of FIG. 4A, the arrangement of FIG. 4B is reciprocal so that the arrangement may be used for a WDM multiplexer.

Figure 5A:
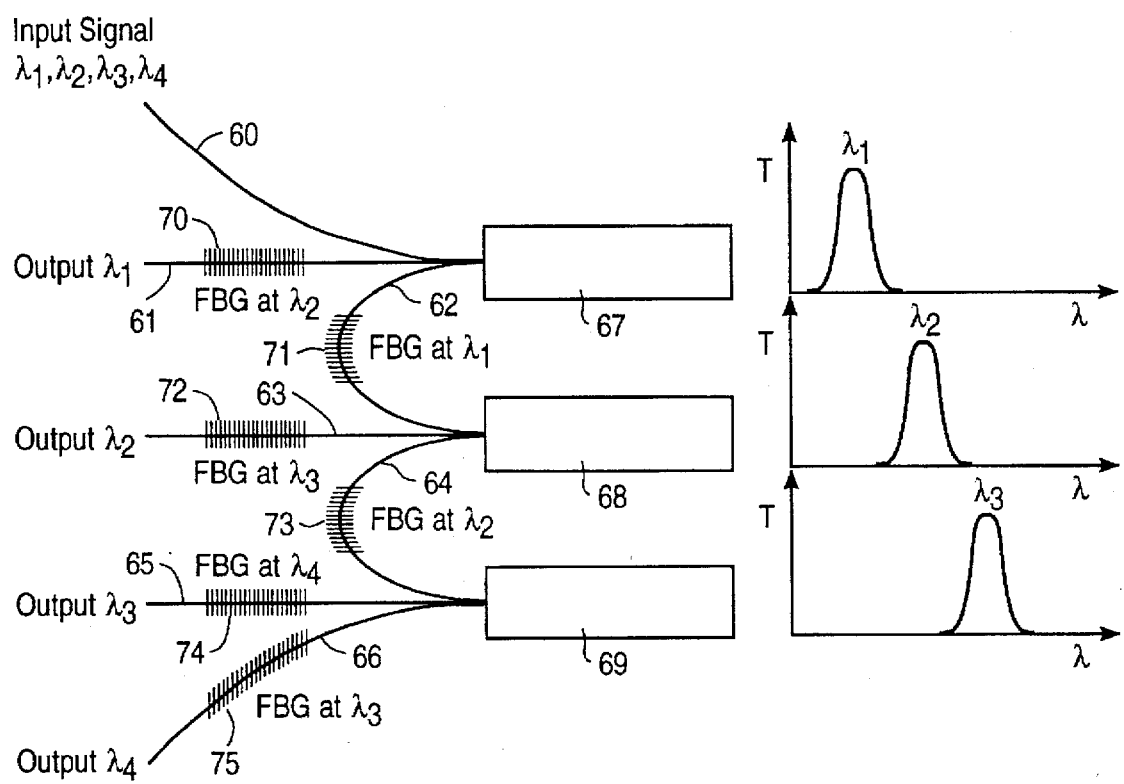
FIG. 5A shows one organization of bandpass wavelength couplers for the device of FIGS. 1A and 1B according to the present invention.
Figure 5B:
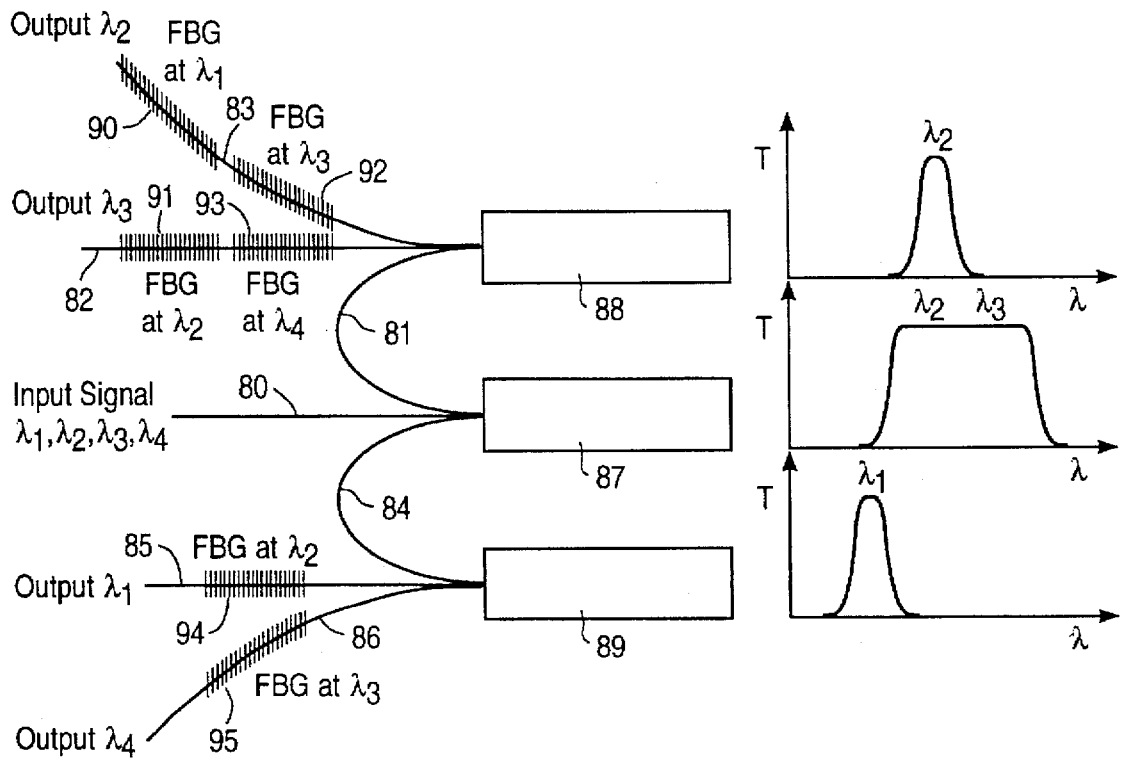
FIG. 5B illustrates another organization of bandpass wavelength couplers for the device of FIGS. 1A and 1B according to the present invention.

To increase the performance of the WDM multiplexer and demultiplexer devices of FIGS. 1A and 1B, the bandpass filter coupler arrangements in FIGS. 4A and 4B may be modified with the insertion of the fiber Bragg gratings. FIG. 5A illustrates a variation of the FIG. 4A arrangement. In this case, bandpass filter couplers 67–69 and optical fibers 60–66 are arranged like that shown in FIG. 4A. In addition, fiber Bragg gratings are placed in the fibers 61–66 to increase the wavelength discrimination of this arrangement. A fiber Bragg grating 70 having a narrow reflection band centered at wavelength $\lambda_2$ is placed in the fiber 61, a fiber Bragg grating 71 having a narrow reflection band centered at $\lambda_1$ is inserted into the fiber 62, a fiber Bragg grating 72 having a narrow reflection band centered at $\lambda_3$ is inserted into the fiber 63, a fiber Bragg grating 73 having a narrow reflection band centered at $\lambda_2$ is inserted into the fiber 64, a fiber Bragg grating 74 having a narrow reflection band centered at $\lambda_4$ is inserted into the fiber 65, and a fiber Bragg grating 75 having a narrow reflection band centered at $\lambda_3$ is inserted into the fiber 66.

As explained previously, the input optical fiber 60 receives optical signals at wavelengths $\lambda_1$–$\lambda_4$. The fiber Bragg gratings ensure that optical signals at neighboring wavelengths to that specified for a particular optical fiber are further filtered from that fiber. For example, the bandpass filter 67 directs signals at $\lambda_1$ to the optical fiber 61 while the remaining optical signals at $\lambda_2$–$\lambda_4$ are directed onto the optical fiber 62. The fiber Bragg grating 70 ensures that signals at $\lambda_2$ which neighbors the desired wavelength $\lambda_1$ are removed from the optical fiber 61. Similarly, the fiber Bragg grating 71 removes signals at $\lambda_1$ which might have been errantly directed onto fiber 62. The signals on the optical fiber 62 having been further filtered by the fiber Bragg grating 71 are filtered by the coupler 68 having a bandpass filter centered about $\lambda_2$. Optical signals at $\lambda_2$ are directed onto the fiber 63. The fiber Bragg grating 71 ensures that signals at neighboring wavelength $\lambda_3$ are removed from the fiber 63, while fiber Bragg grating 73 ensures that signals at $\lambda_2$ do not propagate on fiber 64 into the coupler 69. That coupler 69 has a bandpass filter centered about $\lambda_3$ which signals are propagated onto fiber 65. The fiber Bragg grating 74 filters out signals at neighboring wavelength $\lambda_4$ while the fiber Bragg grating 75 filters out signals at $\lambda_3$ on the fiber 66.

The arrangement of the couplers 87–89 and fibers 80–86 are similar to that of FIG. 4B. Fiber Bragg gratings 90 and 92 in the fiber 83 and fiber Bragg gratings 91 and 93 in fiber 82, fiber Bragg grating 94 in the fiber 85, and fiber Bragg grating 95 in the fiber 86 increase the isolation between the wavelength channels on the different optical fibers. As described previously, input signals at wavelengths $\lambda_1$–$\lambda_4$ are received through the fiber 80 into the coupler 87 which has a bandpass filter for wavelengths $\lambda_2$ and $\lambda_3$. Signals at these two wavelengths are passed directly onto the fiber 81 into the coupler 88 which has a bandpass filter centered at wavelength $\lambda_2$ so that signals at $\lambda_2$ are directed onto the fiber 83 and signals at $\lambda_3$ are directed onto the fiber 82.

The fiber Bragg grating 90 has a narrow reflection band centered at wavelength $\lambda_1$ and the fiber Bragg grating 92 has a narrow reflection band centered at $\lambda_3$. These two gratings 90 and 92 act as a bandpass filter on the fiber 83 which allows only signals at $\lambda_2$ to continue on the fiber 83. Similarly, the fiber Bragg grating 91 has a narrow reflection band centered at $\lambda_2$ and the fiber Bragg grating 93 has a narrow reflection band centered at $\lambda_4$. These two gratings 91 and 93 operate as a high performance bandpass filter which allows only signals at $\lambda_3$ to continue on the fiber 82.

Signals at $\lambda_1$ and $\lambda_4$ are directed by the coupler 87 onto the fiber 84 into the coupler 89, which has a bandpass filter centered about $\lambda_1$. Signals at $\lambda_1$ are directed onto fiber 85 so that signals at $\lambda_4$ are directed onto the fiber 86. The fiber Bragg grating 94 has a narrow reflection band centered about $\lambda_2$ to act as a cutoff filter. Similarly, the fiber Bragg grating 95 has a narrow reflection band centered about $\lambda_3$ to act as a cutoff filter for $\lambda_4$.

Figure 6A:
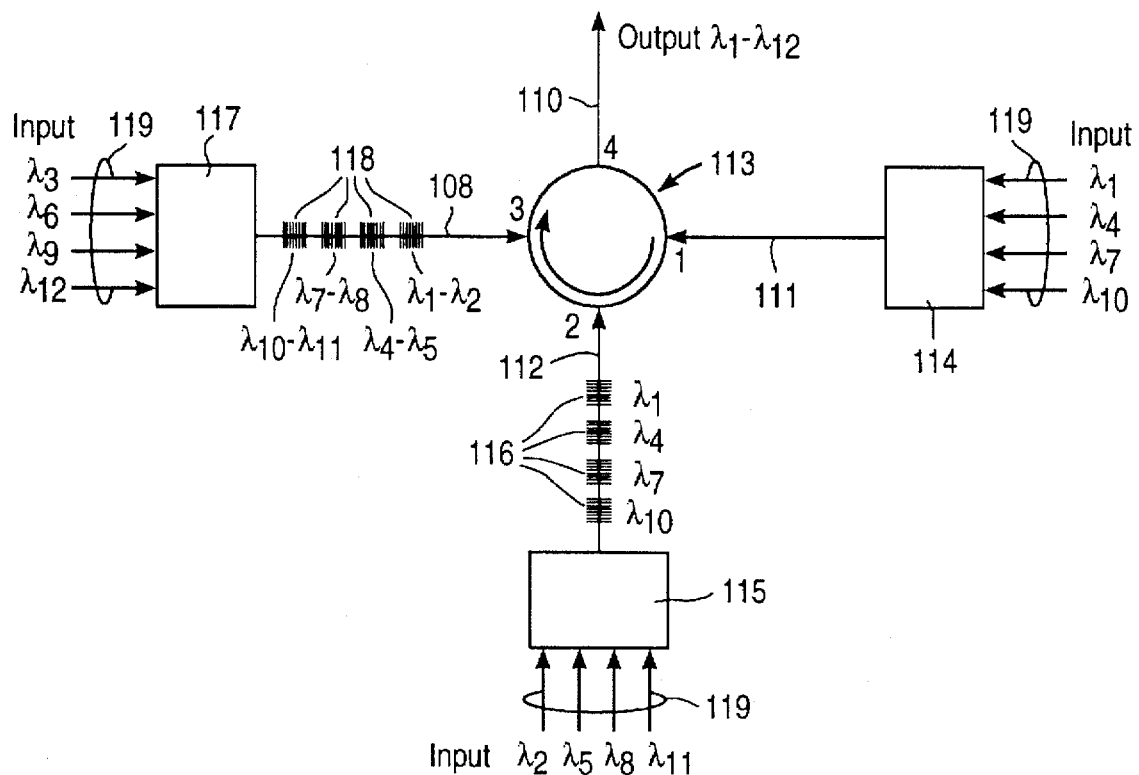
FIG. 6A illustrates a four-port variation of the wavelength division multiplexer device of FIG. 1A according to the present invention.
Figure 6B:
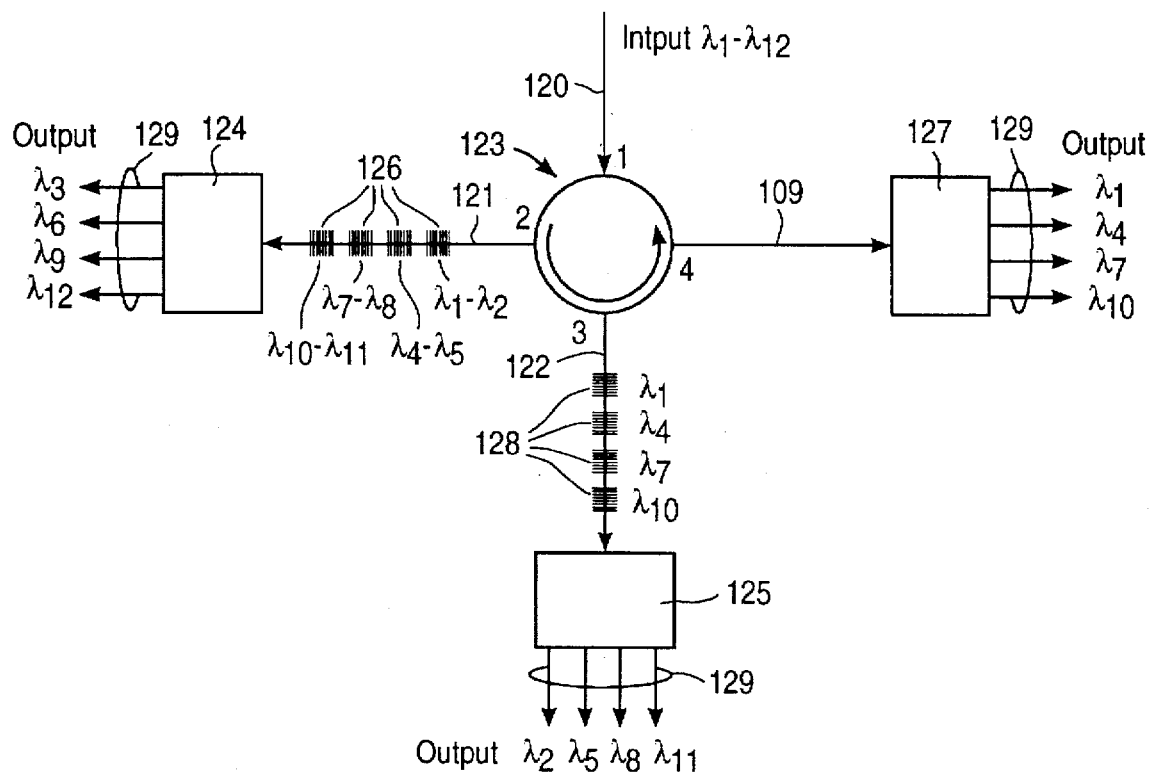
FIG. 6B illustrates a corresponding four-port variation of the wavelength division demultiplexer device of FIG. 1B according to the present invention.

The multiplexer and demultiplexer of FIGS. 1A and 1B use three-port optical circulators. FIGS. 6A and 6B respectively show a multiplexer and demultiplexer with four port circulators according to the present invention. The operation of these devices should be evident from the previous description of operations of the three-port optical circulator devices. The arrangement of the fiber Bragg gratings and their different reflection wavelengths are indicated in the drawings.

Figure 7A:
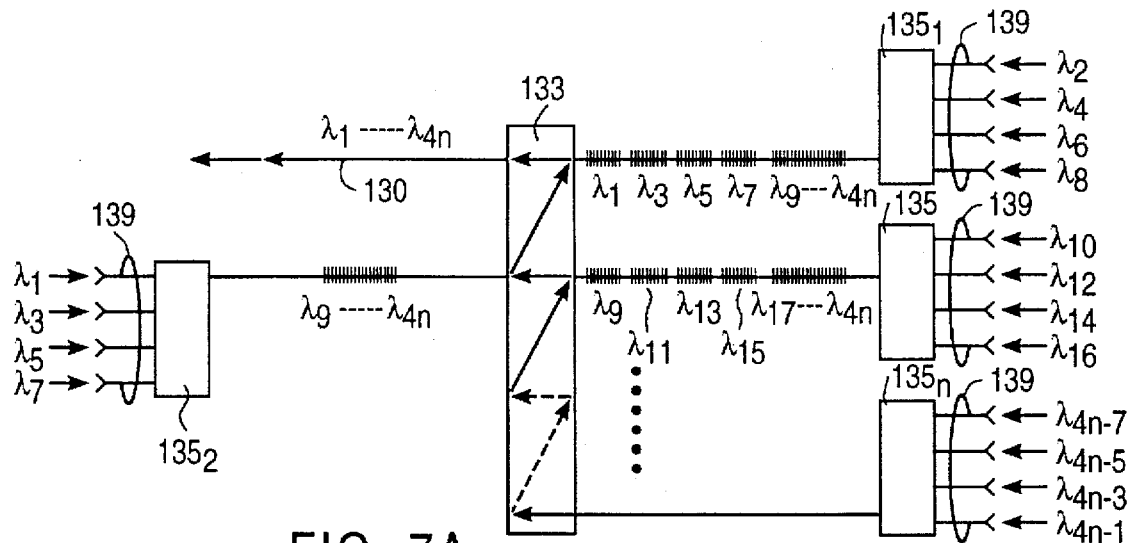
FIGS. 7A and 7B show generalized 4n×1 wavelength division multiplexers according to the present invention.
Figure 7B:
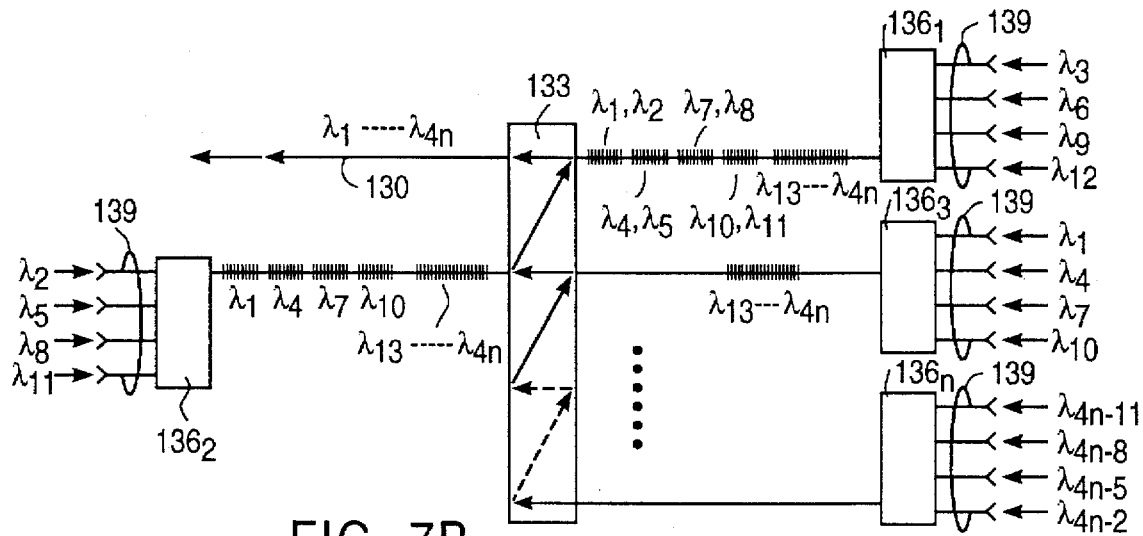

A generalization of multiplexers and demultiplexers with optical circulators having a number of n ports is illustrated in FIGS. 7A, 7B, 8A and 8B. FIGS. 7A and 7B show multiplexers according to the present invention. Optical signals at various wavelengths, as illustrated in the drawings, are received at input fibers 139 connected to different bandpass wavelength division units 135$i$ or 136$i$, i=1 to n, in FIGS. 7A and 7B respectively. The signals from the bandpass wavelength division units 135$i$ or 136$i$ are combined at the n-port circulator 133 and passed to an output fiber 130. The difference between the two multiplexers in FIGS. 7A and 7B is principally the arrangement of the fiber Bragg gratings in the optical fibers connecting the optical circulator 133 and the wavelength division units 135$i$ or 136$i$ (and the corresponding fiber Bragg grating arrangements in the units themselves). Of course, other arrangements of fiber Bragg gratings are conceivable.

Figure 8A:
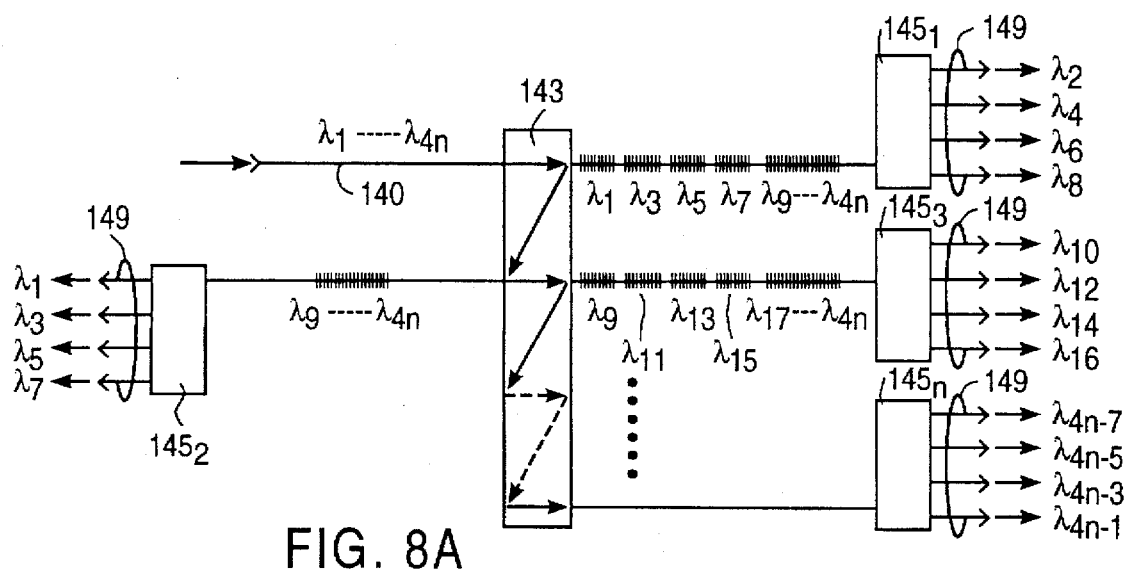
FIGS. 8A and 8B show generalized 1×4n wavelength division demultiplexers according to the present invention.
Figure 8B:
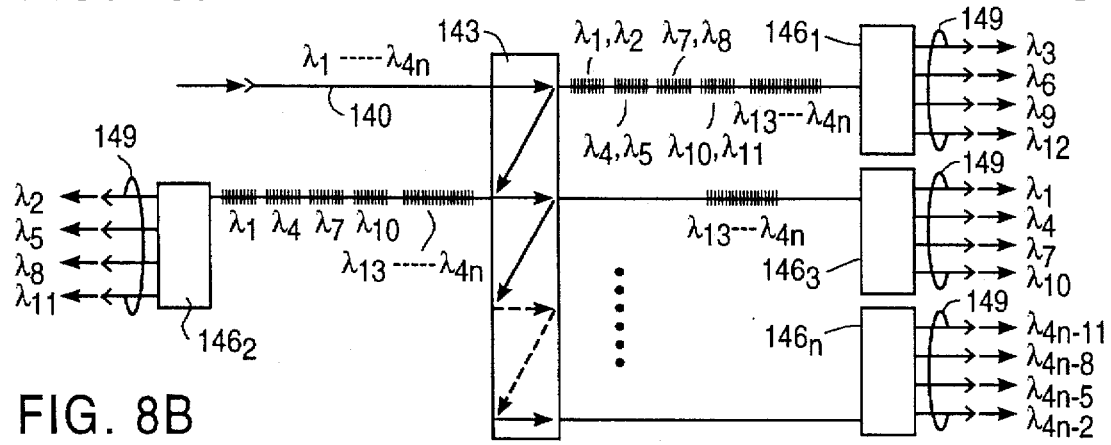

Likewise, FIGS. 8A and 8B show demultiplexers with n-port optical circulators. Optical signals at various wavelengths $\lambda_1$–$\lambda_{4n}$ are received at an input fiber 140 which is connected to the first port of an n-port optical circulator 143. The other ports of the optical circulator 143 are connected to different bandpass wavelength division units $145_i$ or $146_i$, i=1 to n, in FIGS. 8A and 8B respectively, which are connected to output optical fibers 149 which carry optical signals at one of the wavelengths, $\lambda_1$–$\lambda_4$n. Again, the difference between the two demultiplexers in FIGS. 8A and 8B is principally the arrangement of the fiber Bragg gratings in the optical fibers connecting the optical circulator 143 and the bandpass wavelength division units $145_i$ or $146_i$ (and the corresponding fiber Bragg grating arrangements in the units themselves). Other arrangements of fiber Bragg gratings are conceivable.

Figure 9:
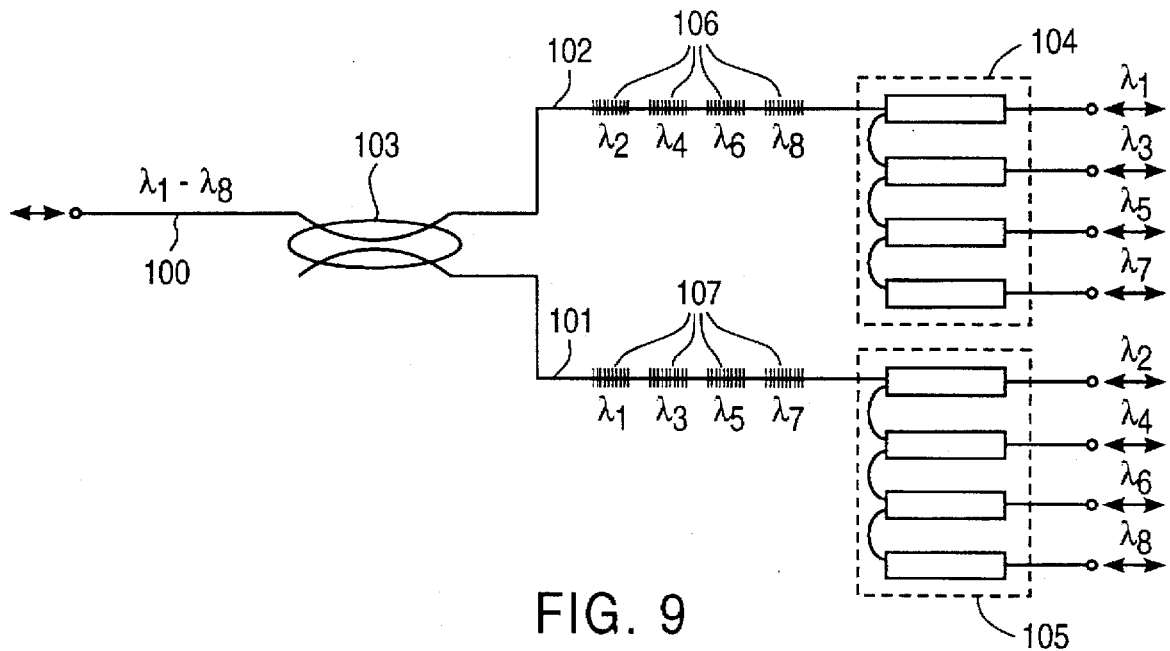
FIG. 9 illustrates a wavelength division multiplexer/demultiplexer according to another embodiment of the present invention.

FIG. 9 illustrates an alternative device which can operate as a WDM multiplexer or demultiplexer. Instead of the optical circulators, the device in FIG. 9 uses an optical coupler 103 which has three ports. One optical port is connected to a trunk optical fiber 100. Another optical port is connected to a bandpass wavelength division unit 104 by an optical fiber 102. The bandpass wavelength division unit 104 is also connected to a plurality (shown as four) of branch optical fibers. The third port of the coupler 103 is connected to a second bandpass wave division unit 105 by an optical fiber 101. The second bandpass wave division unit 105 is also connected to another plurality of branch optical fibers.

The optical coupler 103 is a so-called "3 dB coupler," i.e., the device receives signals through the fiber 100 and splits the signals between the two fibers 101 and 102. Excluding insertion losses, the intensity of signals of fibers 101 or 102 is one-half that of the signals on the fiber 100. Fused biconical couplers or waveguide divider couplers may be used for the optical coupler 103. While being much cheaper than an optical circulator, the performance of the optical coupler 103 is much lower. Hence, it may be desirable to use erbium-doped fiber amplifiers on the line 100 to offset the lower performance of the coupler 103.

In the fiber 102 are fiber Bragg gratings 106 which respectively have narrow reflection bands centered at wavelengths $\lambda_2$, $\lambda_4$, $\lambda_6$ and $\lambda_8$. In a similar fashion, the optical fiber 101 has fiber Bragg gratings 107 with narrow reflection bands centered at wavelengths $\lambda_1$, $\lambda_3$, $\lambda_5$ and $\lambda_7$. The fiber Bragg gratings 106 ensure that optical signals from the fiber 100 and intended for the fiber 101 do not pass into the bandpass division unit 104. In addition, the fiber Bragg gratings 106 act as bandpass filters for the signals from the unit 104 to the coupler 103. Similarly, the fiber Bragg gratings 107 isolate the unit 105 from errant signals for the unit 104 and act as bandpass filters for the optical signals emanating from the unit 105 toward the coupler 103.

Figure 10A:
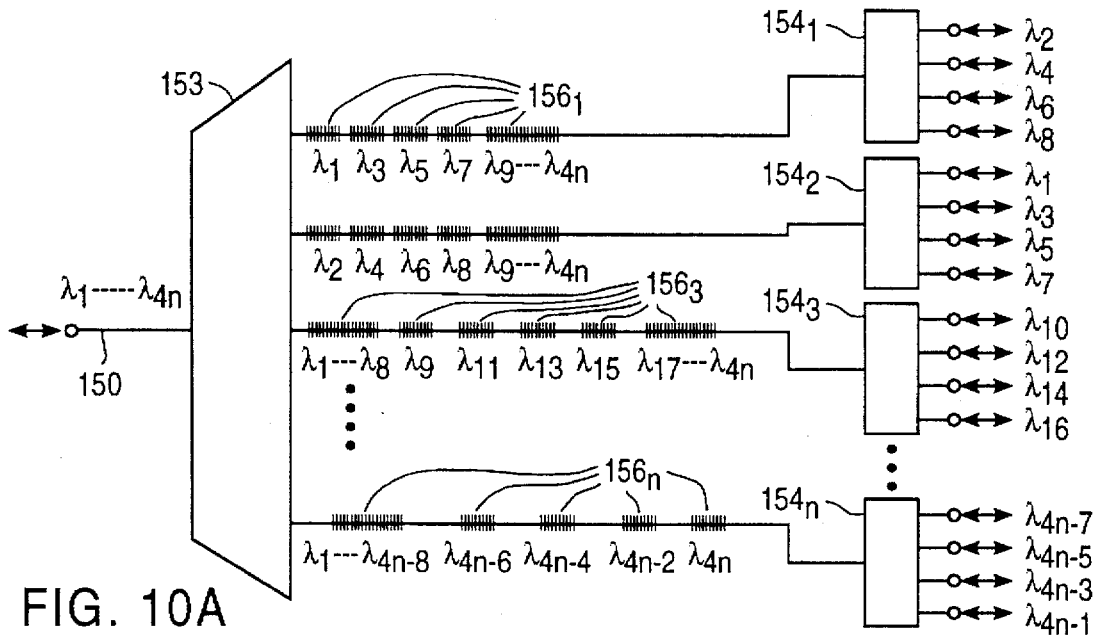
FIGS. 10A and 10B show generalizations of the FIG. 9 multiplexer/demultiplexer for 4n input or output optical fibers.
Figure 10B:
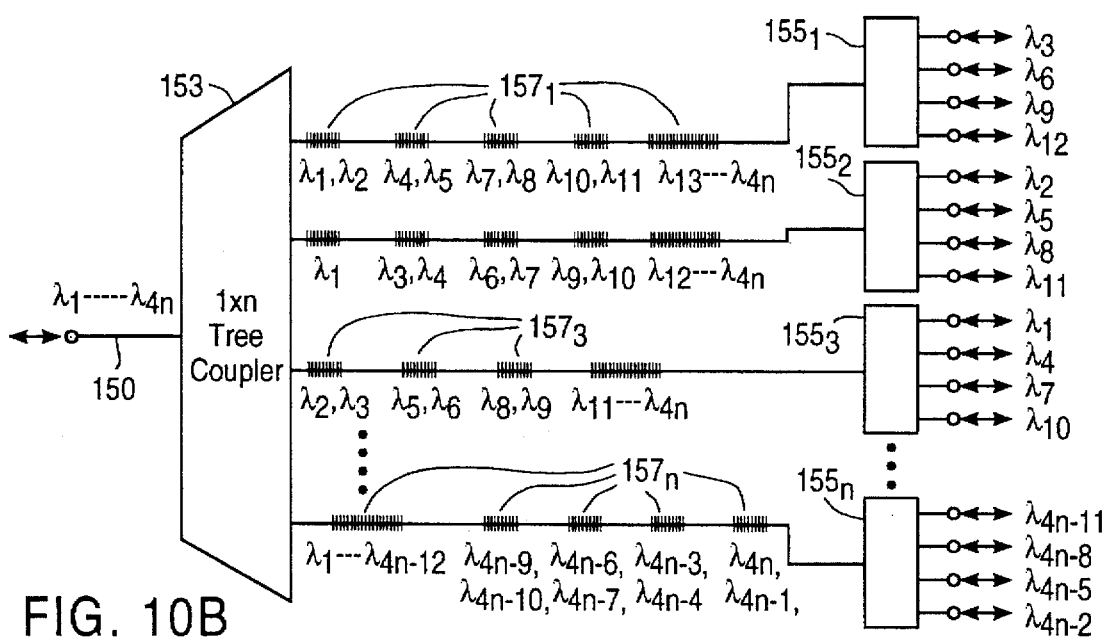

As shown by the directional arrows in FIG. 9, the device operates bidirectionally, i.e., as a multiplexer or a demultiplexer. Generalization of this device are shown in FIGS. 10A and 10B. Rather than a single coupler 103 of FIG. 9, the devices of FIGS. 10A and 10B use a 1xn tree coupler 153. The tree coupler 153 is a well-recognized organization of optical couplers 103 interconnected into a branching "tree" structure, i.e., a single optical coupler is connected to two optical couplers which are, in turn, connected to four optical couplers, and so forth. The tree coupler 153 interconnects sufficient optical couplers 103 so that a single input/output optical fiber 150 is connected to n bandpass wavelength division units $154_i$ and $155_i$, i=1 to n, in FIGS. 10A and 10B respectively. In turn, the bandpass wavelength division units $154_i$ and $155_i$ are connected to 4n output/input optical fibers 159. The principal difference between the FIGS. 10A and 10B devices is the arrangement of the fiber Bragg gratings $156_i$ and $157_i$, i=1 to n, in the optical fibers between the tree coupler 153 and the bandpass wavelength division units $154_i$ and $155_i$ (and the corresponding arrangement of fiber Bragg gratings in the bandpass wavelength division units $154_i$ and $155_i$) so that optical signals at predetermined wavelengths are sent to each of the bandpass wavelength division units $154_i$ and $155_i$. Other arrangements of fiber Bragg gratings are possible.

Besides the described 1xn tree coupler 153, other optical devices might be used. For example, a 1XN fiber optic coupler as described in U.S. Pat. No. 5,016,963, which issued May 21, 1991, might be used in place of the tree coupler 153. If tree couplers 153 continue to be used, fiber Bragg gratings might be arranged between the interconnected fiber optic couplers 103 which make up the tree coupler 153.

Other embodiments of the present invention also include combinations of the multiplexers/demultiplexers of the type illustrated in FIGS. 1A, 1B and 6A, 6B with the multiplexers/demultiplexers of FIG. 9 or the 1XN fiber optic coupler mentioned in the paragraph above. For example, two FIG. 1A multiplexer could be connected to the input fibers of a FIG. 9 multiplexer. Other variations are readily conceivable.

Therefore, while the description above provides a full and complete disclosure of the preferred embodiments of the present invention, various modifications, alternate constructions, and equivalents will be obvious to those with skill in the art. Thus, the scope of the present invention is limited solely by the appended claims.

What is claimed is:

1. A wavelength division multiplexer/demultiplexer connected to a plurality of first optical fibers for carrying optical signals at predetermined wavelengths, each predetermined wavelength different from another, and to a second optical fiber for carrying optical signals at all of said predetermined wavelengths, said wavelength division multiplexer/demultiplexer comprising an optical circulator having at least three ports, said optical circulator serially passing optical signals received at one port to another port, one of said ports connected to said second optical fiber;

a plurality of bandpass wavelength division units, each bandpass wavelength division unit connected to one of said remaining ports and to a set of said first optical fibers, said bandpass wavelength division unit passing optical signals between said set of first optical fibers and said one of said remaining ports;

each of said bandpass wavelength division units comprising a plurality of bandpass wavelength division couplers, each bandpass wavelength division coupler connected to one of said first optical fibers for transmitting optical signals at a predetermined wavelength; and at least one set of fiber Bragg gratings connected between a port and a bandpass wavelength division unit, each fiber Bragg grating having a narrow wavelength reflection band about a predetermined wavelength and arranged so that optical signals at wavelengths differing from predetermined wavelengths of said set of first optical fibers connected to said bandpass wavelength division unit are blocked and reflected.

2. The wavelength division multiplexer/demultiplexer of claim 1 wherein said predetermined wavelengths of said first set of fiber Bragg gratings and said predetermined wavelengths of said set of first optical fibers connected to said bandpass wavelength division unit are alternatingly spaced with respect to each other.

3. The wavelength division multiplexer/demultiplexer of claim 1 wherein said plurality of bandpass wavelength division couplers in said bandpass wavelength division units are connected to each other serially, each bandpass wavelength division coupler passing optical signals from one bandpass wavelength division coupler to another, a last bandpass wavelength division coupler connected to a port of said optical circulator.

4. The wavelength division multiplexer/demultiplexer of claim 3 wherein each of said bandpass wavelength division couplers comprises an end of a first optical fiber;

an end of a second optical fiber;

an end of a third optical fiber;

a collimating lens having first and second end faces, said first end face of said collimating lens and said ends of said first, second and third optical fibers proximate each other and said first end face;

a bandpass filter proximate said second end face of said collimating lens, said bandpass filter, said ends of said first and second optical fibers arranged with respect to each other so that light from said first optical fiber and reflected by said bandpass filter passes into said second optical fiber; and a reflecting element proximate said bandpass filter and opposite said second end face of said collimating lens, said ends of said first and third optical fibers, said collimating lens, said bandpass filter and said reflecting element arranged so that light from said first optical fiber, passed by said bandpass filter and reflected by said reflecting element, passes into said third optical fiber.

5. A wavelength division multiplexer connected to an output optical fiber and a plurality of input optical fibers, said wavelength division multiplexer comprising an optical circulator having first, second and third ports, said optical circulator passing optical signals received at said first port to said second port and passing optical signals received at said second port to said third port, said third port connected to said output optical fiber;

a first bandpass wavelength division unit connected to said first port and to a first set of said input optical fibers, said first bandpass wavelength division unit passing optical signals at a first predetermined wavelength on each first set input optical fiber to said first port, said first predetermined wavelength different for each first set input optical fiber;

a second bandpass wavelength division unit connected to said second port and to a second set of said input optical fibers, said second bandpass wavelength division unit passing optical signals at a second predetermined wavelength on each second set input optical fiber to said second port, said second predetermined wavelength different for each second set input optical fiber and different from each first predetermined wavelength;

said first and second bandpass wavelength division units each comprises a plurality of bandpass wavelength division couplers, each bandpass wavelength division coupler connected to one of said input optical fibers for transmitting optical signals at a first or second predetermined wavelength; and a plurality of fiber Bragg gratings connected between said second port and said second bandpass wavelength division unit, each fiber Bragg grating having a narrow wavelength reflection band about one of said first predetermined wavelengths so that optical signals from said first set of input optical fibers and said second set of input optical fibers are passed to said third port and said output optical fiber.

6. The wavelength division multiplexer of claim 5 wherein said first predetermined wavelengths and second predetermined wavelengths are alternatingly spaced with respect to each other.

7. The wavelength division multiplexer of claim 5 wherein said plurality of bandpass wavelength division couplers in said first and second bandpass wavelength division units are connected to each other serially, each bandpass wavelength division coupler passing optical signals from one bandpass wavelength division coupler to another, a last bandpass wavelength division coupler connected to a port of said optical circulator.

8. The wavelength division multiplexer of claim 5 wherein each of said bandpass wavelength division couplers comprises an end of a first optical fiber;

an end of a second optical fiber;

an end of a third optical fiber;

a collimating lens having first and second end faces, said first end face of said collimating lens and said ends of said first, second and third optical fibers proximate each other and said first end face;

a bandpass filter proximate said second end face of said collimating lens, said bandpass filter, said ends of said first and second optical fibers arranged with respect to each other so that light from said first optical fiber and reflected by said bandpass filter passes into said second optical fiber; and a reflecting element proximate said bandpass filter and opposite said second end face of said collimating lens, said ends of said first and third optical fibers, said collimating lens, said bandpass filter and said reflecting element arranged so that light from said first optical fiber, passed by said bandpass filter, and reflected by said reflecting element passes into said third optical fiber.

9. A wavelength division multiplexer connected to an output optical fiber and a plurality of input optical fibers, said wavelength division multiplexer comprising an optical circulator having first, second and third ports, said optical circulator passing optical signals received at said first port to said second port and passing optical signals received at said second port to said third port, said third port connected to said output optical fiber;

a first means connected to said first port and to a first set of said input optical fibers passing optical signals at a first predetermined wavelength on each first set input optical fiber to said first port, said first predetermined wavelength different for each first set input optical fiber;

a second means connected to said second port and to a second set of said input optical fibers passing optical signals at a second predetermined wavelength on each second set input optical fiber to said second port, said second predetermined wavelength different for each second set input optical fiber and different from each first predetermined wavelength;

said first and second bandpass wavelength division units each comprises a plurality of bandpass wavelength division couplers, each bandpass wavelength division coupler connected to one of said input optical fibers for transmitting optical signals at a first or second predetermined wavelength; and a plurality of fiber Bragg gratings connected between said second port and said second passing means, each fiber Bragg grating having a narrow wavelength reflection band about one of said first predetermined wavelengths so that optical signals from said first set of input optical fibers and said second set of input optical fibers are passed to said third port and said output optical fiber.

10. The wavelength division multiplexer of claim 9 wherein said first predetermined wavelengths and second predetermined wavelengths are alternatingly spaced with respect to each other.

11. The wavelength division multiplexer of claim 9 wherein said plurality of bandpass wavelength division couplers in said first and second bandpass wavelength division units are connected to each other serially, each bandpass wavelength division coupler passing optical signals from one bandpass wavelength division coupler to another, a last bandpass wavelength division coupler connected to a port of said optical circulator.

12. The wavelength division multiplexer of claim 11 wherein each of said bandpass wavelength division couplers comprises an end of a first optical fiber;

an end of a second optical fiber;

an end of a third optical fiber;

a collimating lens having first and second end faces, said first end face of said collimating lens and said ends of said first, second and third optical fibers proximate each other and said first end face;

a bandpass filter proximate said second end face of said collimating lens, said bandpass filter, said ends of said first and second optical fibers arranged with respect to each other so that light from said first optical fiber and reflected by said bandpass filter passes into said second optical fiber; and a reflecting element proximate said bandpass filter and opposite said second end face of said collimating lens, said ends of said first and third optical fibers, said collimating lens, said bandpass filter and said reflecting element arranged so that light from said first optical fiber, passed by said bandpass filter, and reflected by said reflecting element passes into said third optical fiber.

13. A wavelength division demultiplexer connected to an input optical fiber and a plurality of output optical fibers, said wavelength division demultiplexer comprising an optical circulator having first, second and third ports, said optical circulator passing optical signals received at said first port to said second port and passing optical signals received at said second port to said third port, said first port connected to said input optical fiber;

a first bandpass wavelength division unit connected to said second port and to a first set of said output optical fibers, said first bandpass wavelength division unit passing optical signals at a first predetermined wavelength from said second port to one of said first set output optical fibers, said first predetermined wavelength different for each first set output optical fiber;

a second bandpass wavelength division unit connected to said third port and to a second set of said output optical fibers, said second bandpass wavelength division unit passing optical signals at a second predetermined wavelength from said third port to one of said second set output optical fibers, said second predetermined wavelength different for each second set output optical fiber and different from each first predetermined wavelength;

said first and second bandpass wavelength division units each comprise a plurality of bandpass wavelength division couplers, each bandpass wavelength division coupler connected to one of said output optical fibers for transmitting optical signals at a first or second predetermined wavelength; and a plurality of fiber Bragg gratings connected between said second port and said first bandpass wavelength division unit, each fiber Bragg grating having a narrow wavelength reflection band about one of said second predetermined wavelengths so that optical signals from said input optical fiber at said second predetermined wavelengths are passed to said third port and said second set output optical fibers.

14. The wavelength division demultiplexer of claim 13 wherein said first predetermined wavelengths and second predetermined wavelengths are alternatingly spaced with respect to each other.

15. The wavelength division demultiplexer of claim 13 wherein said plurality of bandpass wavelength division couplers in said first and second bandpass wavelength division units are connected to each other serially, each bandpass wavelength division coupler passing optical signals from one bandpass wavelength division coupler to another, a first bandpass wavelength division coupler connected to a port of said optical circulator.

16. The wavelength division demultiplexer of claim 15 wherein each of said bandpass wavelength division couplers comprises an end of a first optical fiber;

an end of a second optical fiber;

an end of a third optical fiber;

a collimating lens having first and second end faces, said first end face of said collimating lens and said ends of said first, second and third optical fibers proximate each other and said first end face;

a bandpass filter proximate said second end face of said collimating lens, said bandpass filter, said ends of said first and second optical fibers arranged with respect to each other so that light from said first optical fiber and reflected by said bandpass filter passes into said second optical fiber; and a reflecting element proximate said bandpass filter and opposite said second end face of said collimating lens, said ends of said first and third optical fibers, said collimating lens, said bandpass filter and said reflecting element arranged so that light from said first optical fiber, passed by said bandpass filter, and reflected by said reflecting element passes into said third optical fiber.

17. A wavelength division demultiplexer connected to an input optical fiber and a plurality of output optical fibers, said wavelength division demultiplexer comprising an optical circulator having first, second and third ports, said optical circulator passing optical signals received at said first port to said second port and passing optical signals received at said second port to said third port, said first port connected to said input optical fiber;

a first means connected to said second port and to a first set of said output optical fibers for passing optical signals at a first predetermined wavelengths from said second port to one of said first set output optical fibers, said first predetermined wavelength different for each first set output optical fiber;

a second means connected to said third port and to a second set of said output optical fibers for passing optical signals at second predetermined wavelengths from said third port to one of said second set output optical fibers, said second predetermined wavelengths different for each second set output optical fiber and different from each first predetermined wavelength;

said first and second passing means each comprises a plurality of bandpass wavelength division couplers, each bandpass wavelength division coupler connected to one of said output optical fibers for transmitting optical signals at a first or second predetermined wavelength; and a plurality of fiber Bragg gratings connected between said second port and said first passing means, each fiber Bragg grating having a narrow wavelength reflection band about one of said second predetermined wavelengths so that optical signals from said input optical fiber and at said second predetermined wavelengths are passed to said third port and said second set output optical fibers.

18. The wavelength division demultiplexer of claim 17 wherein said first predetermined wavelengths and second predetermined wavelengths are alternatingly spaced with respect to each other.

19. The wavelength division demultiplexer of claim 17 wherein said plurality of bandpass wavelength division couplers in said first and second passing means are connected to each other serially, each bandpass wavelength division coupler passing optical signals from one bandpass wavelength division coupler to another, a first bandpass wavelength division coupler connected to a port of said optical circulator.

20. The wavelength division demultiplexer of claim 19 wherein each of said bandpass wavelength division couplers comprises an end of a first optical fiber;

an end of a second optical fiber;

an end of a third optical fiber;

a collimating lens having first and second end faces, said first end face of said collimating lens and said ends of said first, second and third optical fibers proximate each other and said first end face;

a bandpass filter proximate said second end face of said collimating lens, said bandpass filter, said ends of said first and second optical fibers arranged with respect to each other so that light from said first optical fiber and reflected by said bandpass filter passes into said second optical fiber; and a reflecting element proximate said bandpass filter and opposite said second end face of said collimating lens, said ends of said first and third optical fibers, said collimating lens, said bandpass filter and said reflecting element arranged so that light from said first optical fiber, passed by said bandpass filter, and reflected by said reflecting element passes into said third optical fiber.

21. A wavelength division multiplexer/demultiplexer connected between a trunk optical fiber and a plurality of branch optical fibers, said first wavelength division multiplexer/demultiplexer comprising an optical coupler having first, second and third ports, said third port connected to said trunk optical fiber;

a first bandpass wavelength division unit connected to said first port and to a first set of said branch optical fibers, said first bandpass wavelength division unit passing optical signals at first predetermined wavelengths between said first set optical fibers and said first port, each first predetermined wavelength for each first set optical fiber;

a plurality of first fiber Bragg gratings connected between said first port and said first bandpass wavelength division unit, each first fiber Bragg grating having a narrow wavelength reflection band about one of second predetermined wavelengths between said first predetermined wavelengths so that optical signals between said first bandpass wavelength division unit and said first port are passed at said first predetermined wavelengths and blocked at said second predetermined wavelengths;

a second bandpass wavelength division unit connected to said second port and to a second set of said branch optical fibers, said second bandpass wavelength division unit passing optical signals at said second predetermined wavelengths between said second set optical fibers and said second port, each predetermined wavelength for each second set optical fiber;

a plurality of second fiber Bragg gratings connected between said second port and said second bandpass wavelength division unit, each second fiber Bragg grating having a narrow wavelength reflection band about one of said first predetermined wavelengths so that optical signals between said second bandpass wavelength division unit and said second port are passed at said second predetermined wavelengths and blocked at said first predetermined wavelengths; and said first and second bandpass wavelength division units each comprising a plurality of bandpass wavelength division couplers, each bandpass wavelength division coupler connected to one of said branch optical fibers for transmitting optical signals at first or second predetermined wavelengths.

22. The multiplexer/demultiplexer of claim 21 wherein said optical coupler comprises a fused biconical coupler.

23. The multiplexer/demultiplexer of claim 21 wherein said optical coupler comprises a waveguide divider coupler.

24. The wavelength division multiplexer/demultiplexer of claim 21 wherein said first predetermined wavelengths and second predetermined wavelengths are alternatingly spaced with respect to each other.

25. The wavelength division multiplexer/demultiplexer of claim 21 wherein said plurality of bandpass wavelength division couplers in said first and second bandpass wavelength division units are connected to each other serially, each bandpass wavelength division coupler passing optical signals from one bandpass wavelength division coupler to another, a last bandpass wavelength division coupler connected to a port of said optical coupler.

26. The wavelength division multiplexer/demultiplexer of claim 21 wherein each of said bandpass wavelength division couplers comprises an end of a first optical fiber;

an end of a second optical fiber;

an end of a third optical fiber;

a collimating lens having first and second end faces, said first end face of said collimating lens and said ends of said first, second and third optical fibers proximate each other and said first end face;

a bandpass filter proximate said second end face of said collimating lens, said bandpass filter, said ends of said first and second optical fibers arranged with respect to each other so that light from said first optical fiber and reflected by said bandpass filter passes into said second optical fiber; and a reflecting element proximate said bandpass filter and opposite said second end face of said collimating lens, said ends of said first and third optical fibers, said collimating lens, said bandpass filter and said reflecting element arranged so that light from said first optical fiber, passed by said bandpass filter, and reflected by said reflecting element passes into said third optical fiber.

27. A wavelength division multiplexer/demultiplexer system comprising 21 comprising a first wavelength division multiplexer/demultiplexer connected between a first optical fiber and a plurality of branch optical fibers, said first wavelength division multiplexer/demultiplexer comprising an optical coupler having first, second and third ports, said third port connected to said first optical fiber;

a first bandpass wavelength division unit connected to said first port and to a first set of said branch optical fibers, said first bandpass wavelength division unit passing optical signals at first predetermined wavelengths between said first set optical fibers and said first port, each first predetermined wavelength for each first set optical fiber;

a plurality of first fiber Bragg gratings connected between said first port and said first bandpass wavelength division unit, each first fiber Bragg grating having a narrow wavelength reflection band about one of second predetermined wavelengths between said first predetermined wavelengths so that optical signals between said first bandpass wavelength division unit and said first port are passed at said first predetermined wavelengths and blocked at said second predetermined wavelengths;

a second bandpass wavelength division unit connected to said second port and to a second set of said branch optical fibers, said second bandpass wavelength division unit passing optical signals at said second predetermined wavelengths between said second set optical fibers and said second port, each predetermined wavelength for each second set optical fiber;

a plurality of second fiber Bragg gratings connected between said second port and said second bandpass wavelength division unit, each second fiber Bragg grating having a narrow wavelength reflection band about one of said first predetermined wavelengths so that optical signals between said second bandpass wavelength division unit and said second port are passed at said second predetermined wavelengths and blocked at said first predetermined wavelengths; and said first and second bandpass wavelength division units each comprising a plurality of bandpass wavelength division couplers, each bandpass wavelength division coupler connected to one of said branch optical fibers for transmitting optical signals at a first or second predetermined wavelength; and a second wavelength division multiplexer/demultiplexer connected to a plurality of first optical fibers, including said first optical fiber connected to said first wavelength division multiplexer/demultiplexer, for carrying optical signals at predetermined wavelengths, each predetermined wavelength different from another, and to a second optical fiber for carrying optical signals at all of said predetermined wavelengths, said second wavelength division multiplexer/demultiplexer comprising an optical circulator having at least three ports, said optical circulator serially passing optical signals received at one port to another port, one of said ports connected to said second optical fiber;

a plurality of bandpass wavelength division units, each bandpass wavelength division unit connected to one of said remaining ports and to a set of said first optical fibers, said bandpass wavelength division unit passing optical signals between said set of first optical fibers and said one of said remaining ports; and at least one set of fiber Bragg gratings connected between a port and a bandpass wavelength division unit, each fiber Bragg grating having a narrow wavelength reflection band about a predetermined wavelength and arranged so that optical signals at wavelengths differing from predetermined wavelengths of said set of first optical fibers connected to said bandpass wavelength division unit are blocked and reflected.

28. The wavelength division multiplexer/demultiplexer system of claim 27 wherein said optical circulator of said second multiplexer/demultiplexer has four ports.

29. The wavelength division multiplexer/demultiplexer system of claim 27 wherein said optical circulator of said second multiplexer/demultiplexer has n ports, where n is greater than four.

30. A wavelength division multiplexer/demultiplexer system 21 comprising a first wavelength division multiplexer/demultiplexer connected between a trunk optical fiber and a plurality of branch optical fibers, said first wavelength division multiplexer/demultiplexer comprising an optical coupler having first, second and third ports, said third port connected to said trunk optical fiber;

a first bandpass wavelength division unit connected to said first port and to a first set of said branch optical fibers, said first bandpass wavelength division unit passing optical signals at first predetermined wavelengths between said first set branch optical fibers and said first;

a plurality of first fiber Bragg gratings connected between said first port and said first bandpass wavelength division unit, each first fiber Bragg grating having a narrow wavelength reflection band about one of second predetermined wavelengths between said first predetermined wavelengths so that optical signals between said first bandpass wavelength division unit and said first port are passed at said first predetermined wavelengths and blocked at said second predetermined wavelengths:

a second bandpass wavelength division unit connected to said second port and to a second set of said branch optical fibers, said second bandpass wavelength division unit passing optical signals at said second predetermined wavelengths between said second set branch optical fibers and said second port;

a plurality of second fiber Bragg gratings connected between said second port and said second bandpass wavelength division unit, each second fiber Bragg grating having a narrow wavelength reflection band about one of said first predetermined wavelengths so that optical signals between said second bandpass wavelength division unit and said second port are passed at said second predetermined wavelengths and blocked at said first predetermined wavelengths; and said first and second bandpass wavelength division units each comprising a plurality of bandpass wavelength division couplers, each bandpass wavelength division coupler connected to one of said branch optical fibers for transmitting optical signals at first or second predetermined wavelengths; and a second wavelength division multiplexer/demultiplexer connected to a plurality of first optical fibers for carrying optical signals at a set of said first predetermined wavelengths, each first predetermined wavelength different from another, and to one of said branch optical fibers connected to said first bandpass wavelength division unit of said first multiplexer/demultiplexer for carrying optical signals at a set of said first predetermined wavelengths, said wavelength division multiplexer/demultiplexer comprising an optical circulator having at least three ports, said optical circulator serially passing optical signals received at one port to another port, one of said ports connected to said one branch optical fiber;

a plurality of bandpass wavelength division units, each bandpass wavelength division unit connected to one of said remaining ports and to a set of said first optical fibers, said bandpass wavelength division unit passing optical signals between said set of first optical fibers and said one of said remaining ports; and at least one set of fiber Bragg gratings connected between a port and a bandpass wavelength division unit, each fiber Bragg grating having a narrow wavelength reflection band about a first predetermined wavelength and arranged so that optical signals at wavelengths differing from first predetermined wavelengths of said set of first optical fibers connected to said bandpass wavelength division unit are blocked and reflected.

31. The wavelength division multiplexer/demultiplexer system of claim 30 wherein said optical circulator of said second multiplexer/demultiplexer has four ports.

32. The wavelength division multiplexer/demultiplexer system of claim 30 wherein said optical circulator of said second multiplexer/demultiplexer has n ports, where n is greater than four.

* * * * *